(12) United States Patent
Yang et al.

(10) Patent No.: US 7,566,676 B2
(45) Date of Patent: *Jul. 28, 2009

(54) PREPARATION METHOD OF SOLID TITANIUM CATALYST FOR OLEFIN POLYMERIZATION

(75) Inventors: Chun-Byung Yang, Daejeon (KR); Ho-Sik Chang, Daejeon (KR); Ki-Hwa Lee, Daejeon (KR)

(73) Assignee: Samsung Total Petrochemicals Co., Ltd., Dokgod-ri, Daesan-up, Seosan-shi, Chungcheongnam Province (KR)

( * ) Notice: Subject to any disclaimer, the term of this patent is extended or adjusted under 35 U.S.C. 154(b) by 2 days.

This patent is subject to a terminal disclaimer.

(21) Appl. No.: 10/598,166

(22) PCT Filed: Oct. 15, 2004

(86) PCT No.: PCT/KR2004/002639

§ 371 (c)(1),
(2), (4) Date: Mar. 6, 2008

(87) PCT Pub. No.: WO2005/082950

PCT Pub. Date: Sep. 9, 2005

(65) Prior Publication Data

US 2008/0167179 A1    Jul. 10, 2008

(30) Foreign Application Priority Data

Feb. 27, 2004    (KR) .................. 10-2004-0013466

(51) Int. Cl.
*C08F 4/42* (2006.01)

(52) U.S. Cl. .................. 502/115; 502/103; 502/126; 502/125; 526/142; 526/124.2; 526/124.3

(58) Field of Classification Search .................. 502/103, 502/126, 125, 115; 526/142, 124.2, 124.3
See application file for complete search history.

(56) References Cited

U.S. PATENT DOCUMENTS

| | | | |
|---|---|---|---|
| 4,071,674 A | 1/1978 | Kashiwa et al. | |
| 4,158,642 A | 6/1979 | Langer, Jr. | |
| 4,315,874 A | 2/1982 | Ushida et al. | |
| 4,330,649 A | 5/1982 | Kioka et al. | |
| 4,347,158 A | 8/1982 | Kaus et al. | |
| 4,399,054 A | 8/1983 | Ferraris et al. | |
| 4,422,957 A | 12/1983 | Kaus et al. | |
| 4,425,257 A | 1/1984 | Miro et al. | |
| 4,477,639 A | 10/1984 | Nielsen | |
| 4,482,687 A | 11/1984 | Noshay et al. | |
| 4,618,661 A | 10/1986 | Kaus et al. | |
| 4,680,381 A | 7/1987 | Asada et al. | |
| 5,106,807 A | 4/1992 | Morini et al. | |
| 6,034,025 A * | 3/2000 | Yang et al. | 502/126 |
| 7,151,071 B2 * | 12/2006 | Kim et al. | 502/103 |

* cited by examiner

*Primary Examiner*—Ling-Siu Choi
(74) *Attorney, Agent, or Firm*—Barlow, Josephs & Holmes, Ltd.

(57) ABSTRACT

The present invention relates to a preparation method of solid titanium catalyst for olefin polymerization comprising the steps of: (1) preparing a magnesium compound solution by dissolving a magnesium halide compound into a mixed solvent of a cyclic ether and one or more of alcohol; (2) preparing a carrier by adding firstly a titanium halide compound to the magnesium compound solution at low temperature, elevating the temperature of the resulted solution or aging it, and then thereto adding secondly the titanium halide compound additionally; (3) preparing a titanium catalyst by reacting the carrier with a titanium compound and an electron donor; and (4) washing the titanium catalyst with hydrocarbon solvent at high temperature.

5 Claims, No Drawings

PREPARATION METHOD OF SOLID TITANIUM CATALYST FOR OLEFIN POLYMERIZATION

TECHNICAL FIELD

The present invention relates to a preparation method of a solid titanium catalyst for olefin polymerization. Particularly, the present invention relates to a preparation method of a solid titanium catalyst for olefin polymerization, which comprises the steps of: (1) preparing a magnesium compound solution by dissolving a magnesium halide compound into a mixed solvent of a cyclic ether and one or more of alcohol; (2) preparing a carrier by adding firstly a titanium halide compound to the magnesium compound solution at low temperature, elevating the temperature of the resulted solution or aging it, and then thereto adding secondly the titanium halide compound additionally; (3) preparing a titanium catalyst by reacting the carrier with a titanium compound and an electron donor; and (4) washing the titanium catalyst with hydrocarbon solvent at high temperature.

BACKGROUND ART

A number of catalysts for olefin polymerization and polymerization processes have been developed so far. However, in order to obtain more sufficient commercial benefits out of such developed catalysts, there have been still great demands for further development on the activity and production yield of a catalyst itself to raise the whole productivity, or on properties of a polymer produced by those developed catalysts to improve the product quality.

There have been reported so far many titanium-based catalysts for olefin polymerization containing magnesium and preparation processes thereof, and also a number of catalyst preparation methods are known in this art, wherein a magnesium compound solution is used in order to control the shape or size, etc. of a catalyst. Methods for obtaining a magnesium compound solution by reacting a magnesium compound with an electron donor such as alcohol, amine, ether, ester, carboxylic acid and the like, in the presence of a hydrocarbon solvent, are commonly known. Among those methods, methods using alcohol are disclosed in U.S. Pat. Nos. 4,330,649 and 5,106,807, and Japanese Patent Laid-Open Sho-58-83006. Further, various methods for preparing a magnesium solution are found in U.S. Pat. Nos. 4,315,874, 4,399,054 and 4,071,674. Particularly, tetrahydrofuran, which is a cyclic ether, has been variously used, for example, to a magnesium chloride compound in U.S. Pat. No. 4,482,687, as an additive for a cocatalyst in U.S. Pat. No. 4,158,642, as a solvent in U.S. Pat. No. 4,477,639 and the like.

Further, U.S. Pat. Nos. 4,347,158, 4,422,957, 4,425,257, 4,618,661 and 4,680,381 disclose a method for preparing a catalyst by adding a Lewis acid compound such as aluminum chloride to a magnesium chloride support and then grinding the mixture.

However, according to those foregoing conventional arts, catalyst properties are not satisfying enough, regarding its morphological properties such as catalyst shape, size and size distribution, and further complement or improvement in stereoregularity of the obtained polymers is also required.

Therefore, to improve the commercial value of such catalyst for olefin polymerization, still required is a preparation method for a catalyst with high polymerization activity and controlled shape and size being capable of providing a polymer with high stereoregularity so as to improve both productivity and product quality.

DISCLOSURE

As a result of repeated researches for solving above-mentioned problems of the conventional arts, the inventors found that a catalyst with controlled shape and size can be obtained at high yield: by dissolving a magnesium halide compound into a mixed solvent of cyclic ether and alcohol to prepare a magnesium compound solution; reacting firstly the magnesium compound solution with a titanium halide compound at relatively low temperature to give some particles with controlled shape and size and then reacting secondly with the titanium halide compound additionally to control the production yield and shape of the catalyst; and washing the resulted titanium catalyst with a hydrocarbon solvent at high temperature, thereby raising the stereoregularity of the resulted polymer. Therefore, the inventors have finally completed the present invention, which can provide a solid titanium catalyst for olefin polymerization with controlled shape and size, at high production yield, and also olefin polymers having high stereoregularity and spherical particle shape by using the resulted catalyst for olefin polymerization.

Therefore, one of objects of the present invention is to provide a preparation method of a catalyst for olefin polymerization having high polymerization activity and good particle shape with well-controlled regular spherical shape, and producing polymers with high stereoregularity and spherical particle shape when used in olefin polymerization.

According to the present invention, a preparation method for a solid titanium catalyst for olefin polymerization is provided, which comprises the steps of: (1) preparing a magnesium compound solution by dissolving a magnesium halide compound into a mixed solvent of a cyclic ether and one or more of alcohol; (2) preparing a carrier by adding firstly a titanium halide compound having a general formula of $Ti(OR)_a X_{(4-a)}$, in which R is an alkyl group having 1-10 carbon atoms, X is a halogen atom and a is an integer of 0-3, to the magnesium compound solution at −10-30° C., elevating the temperature of the resulted solution or aging it, and then thereto adding secondly the titanium halide compound additionally; (3) preparing a titanium catalyst by reacting the carrier with a titanium compound and an electron donor; and (4) washing the titanium catalyst with hydrocarbon solvent at 40-200° C.

Hereinafter, the preparation method for a catalyst according to the present invention is further described in detail, step by step.

Examples of the magnesium halide compound useful in the step (1) of the preparation method of a catalyst according to the present invention, include halogenated magnesium, alkylmagnesium halide, alkoxymagnesium halide, aryloxymagnesium halide and the like, or a mixture of two or more selected from above. The magnesium halide compound can be used in the form of a complex with other metals.

Cyclic ether useful in the step (1) includes those having 3-6 carbon atoms in the ring or derivatives thereof. Particularly, in terms of the morphological properties of the catalyst, preferred is tetrahydrofuran or 2-methyl tetrahydrofuran, and particularly preferred is tetrahydrofuran.

Alcohol useful in the step (1) includes one or more of primary or polyhydric alcohols having 1-20 carbon atoms, and from the viewpoint of mixing properties with the cyclic ether and dissolution properties of the magnesium halide compound, preferred is one or more of alcohol having 2-12 carbon atoms.

In the step (1), molar ratio of said cyclic ether to one or more of alcohol is preferably 1:0.1-1:10, more preferably 1:0.2-1:5. When the molar ratio is less than 1:0.1 or more than 1:10, effect of controlling the shape and size of catalyst is lowered.

Further, in the step (1), molar ratio of the magnesium halide compound to the mixed solvent of cyclic ether and one or more of alcohol is preferably 1:1-1:20, more preferably 1:2-1:10. When the molar ratio is less than 1:1, dissolution of the magnesium halide compound tends to become poor, and when it is more than 1:20, the required amount of an aluminum compound used to obtain catalyst particles should be excessively increased and control of the shape and size of the catalyst particle becomes difficult.

The temperature for dissolution in the step (1) may be various depending on the types or amounts of cyclic ether and alcohol used, but preferred is in the range of 25-200° C. and more preferred is in the range of 50-150° C. When the temperature for dissolution is lower than 25° C., the dissolution of the magnesium halide compound tends to become difficult, and when it is higher than 200° C., the vapor pressure of the solvent becomes too excessively high to control the reaction.

Also, an aliphatic or aromatic hydrocarbon solvent may be additionally used for dilution in the step (1). Examples of the additional hydrocarbon solvent useful in the step (1) include: aliphatic hydrocarbon such as pentane, hexane, heptane, octane, decane or kerosene; alicyclic hydrocarbon such as cyclohexane or methylcyclohexane; aromatic hydrocarbon such as benzene, toluene, xylene or ethylbenzene; and halogenated hydrocarbon such as trichloroethylene, carbon tetrachloride or chlorobenzene.

Examples of the titanium halide compound useful in the step (2), represented by the general formula $Ti(OR)_a X_{(4-a)}$, include: titanium tetrachloride, methoxytitanium trichloride, ethoxytitanium trichloride, propoxytitanium trichloride, butoxytitanium trichloride, octoxytitanium trichloride, dimethoxytitanium dichloride, diethoxytitanium dichloride, trimethoxytitanium chloride and the like, and among them, titanium tetrachloride is preferably used. Also, mixtures of two or more selected from above compounds may be used. In the general formula of the titanium halide compound, R is an alkyl group having 1-10 carbon atoms, X is a halogen atom, and a is an integer of 0-3 for balancing the atomic valence of the formula.

In the step (2), the titanium halide compound is added firstly at −10-30° C. so as to prevent the immediate precipitation of particles at the first addition. When the temperature for the first addition is lower than −10° C., the reaction of the titanium halide compound with the magnesium compound solution is not facilitated, and when it is higher than 30° C., the control of particle shape becomes difficult since particles are immediately precipitated at the first addition.

In the step (2), the molar ratio of the firstly-added titanium halide compound to the mixed solvent of cyclic ether and one or more of alcohol is preferably 1:3.0-1:10. When the molar ratio is less than 1:3.0, excessive amount of precipitates are formed during the first addition so that the control of particle shape becomes difficult, and when it is more than 1:10, catalyst yield is not sufficient enough.

In the step (2), after the first addition of the titanium halide compound to the magnesium compound solution at the temperature of −−10-30° C., a temperature elevation or aging is carried out while suppressing the particle precipitation as much as possible, and then second addition of the titanium halide compound is carried out for further reaction, in order to obtain solid particles used as a carrier with a high yield.

The present invention provides a method for producing a catalyst having well-controlled shape with a relatively high yield, by separating the addition of the titanium halide compound into two stages, the first and the second additions, and specifying the temperature of the first addition and the molar ratios during the addition.

Examples of the titanium compound useful in the step (3) include titanium halide compound, alkyltitanium halide compound, alkoxytitanium halide compound and the like, and titanium halide compound, particularly titanium tetrachloride, is preferably used.

Examples of the electron donor useful in the step (3) include the compounds containing oxygen, nitrogen or phosphorous such as organic acid, ester of an organic acid, alcohol, ether, aldehyde, ketone, amine, amine oxide, amide and phosphoric ester, and more specifically, alkyl ester of benzoic acid such as ethylbenzoate, ethylbromobenzoate, butylbenzoate, isobutylbenzoate, hexylbenzoate or cyclohexylbenzoate or derivatives thereof, or dialkylphthalate having 2-10 carbon atoms such as diisobutylphthalate, diethylphthalate, ethylbutylphthalate or dibutylphthalate or derivatives thereof.

In the step (3), the carrier resulted from the step (2) is reacted with a titanium compound in the presence of a suitable electron donor to prepare a catalyst. The reaction may be completed in a single step, but from the viewpoint of the catalyst production yield, it is preferred to complete the reaction through repeating the reaction two or more times, for example, by separating the resulted reaction mixture into solid and liquid after the first reaction, reacting the residual slurry with additional titanium compound and electron donor one or more times again, and then collecting solid components from the final reaction mixture and drying the collected solid components.

In the step (4), the titanium catalyst obtained from the step (3) is washed with hydrocarbon solvent at 40-200° C. Examples of the hydrocarbon solvent useful in the step (4) include: aliphatic hydrocarbon such as pentane, hexane, heptane, octane, decane or kerosene; alicyclic hydrocarbon such as cyclohexane or methylcyclohexane; aromatic hydrocarbon such as benzene, toluene, xylene or ethylbenzene; and halogenated hydrocarbon such as trichloroethylene, carbon tetrachloride or chlorobenzene, and particularly preferred is hexane or toluene.

The temperature during the washing in the step (4) is preferably 40-200° C., more preferably 50-150° C. When the washing temperature is lower than 40° C., the washing effect is reduced, resulting in deterioration of the stereoregularity of the resulted polymer, and when it is higher than 200° C., the catalyst production yield is lowered. The washing is preferably repeated 2-10 times and the solvent used may be same or different for each washing and may be a single solvent or a mixture. When the number of washing is less than 2, the washing is not sufficiently carried out, and when it is more than 10 times, it causes problems including that the whole processing time becomes longer and the catalyst production yield becomes lower.

In the step (4), after washing the titanium catalyst with hydrocarbon solvent at 40-200° C., further washing may be carried out for 1-5 times or more with a hydrocarbon solvent at 10-35° C.

The catalyst prepared by the method of the present invention, may be advantageously used in olefin polymerization, especially propylene polymerization, and suitably used in copolymerization with other olefins such as ethylene, propylene, 1-butane, 1-pentene, 4-methyl-1-pentene, 1-hexene and the like, or with compounds having polyunsaturated bonds such as conjugated or non-conjugated dynes.

MODE FOR INVENTION

Hereinafter, the present invention is described further in detail, with reference to the following examples, however, the present invention is by no means limited by those illustrative examples.

EXAMPLE 1

[Catalyst Preparation]
Catalyst was prepared through the following 4 steps.
Step (1): Preparation of a Magnesium Compound Solution
To a 500 L reactor equipped with a mechanical stirrer and substituted with nitrogen atmosphere, 15 kg of $MgCl_2$, 225 kg of toluene, 17 kg of tetrahydrofuran and 31 kg of 1-butanol were added, and the temperature of the reactor was elevated to 110° C. with stirring at 70 rpm and then the elevated temperature was maintained for 3 hours to give a homogeneous magnesium compound solution.

Step (2): Preparation of a Solid Carrier
After cooling the magnesium compound solution prepared in the step (1) to 17° C., 32 kg of $TiCl_4$ was added firstly thereto (first addition), then the temperature of the reactor was elevated to 60° C. over 1 hour. When the temperature of the reactor reached to 60° C., additional 13 g of $TiCl_4$ was added secondly thereto (second addition) and reaction was carried out for 30 minutes. After completing the reaction, the resulted mixture was allowed to stand for 30 minutes to settle the resulted carriers down, and the supernatant fluid was removed. The residual slurry in the reactor was washed by repeating 3 times the procedure of adding 90 kg of toluene, stirring, settling the carriers and removing the supernatant fluid to obtain a solid carrier.

Step (3): Catalyst Preparation
To the carrier prepared from the step (2), 80 kg of toluene and 90 kg of $TiCl_4$ were added with stirring at 60 rpm, and the temperature of the reactor was elevated to 110° C. over 1 hour, and then the mixture was aged for 1 hour and allowed to stand for 15 minutes to settle the precipitates down, and the supernatant fluid was removed. Then, 87 kg of toluene, 52 kg of $TiCl_4$ and 4.2 kg of diisobutylphthalate were further added thereto. The temperature of the reactor was elevated to 120° C. and maintained for 1 hour for reaction, and then the mixture was allowed to stand for 30 minutes to settle the precipitates down and the supernatant fluid was removed. Thereto 80 kg of toluene and 76 kg of $TiCl_4$ were added again, the reaction was carried out at 100° C. for 30 minutes, the resulted mixture was allowed to stand to settle the precipitates down, and the supernatant was removed to give catalyst slurry.

Step (4): Washing of Resulted Catalyst Slurry
To the catalyst slurry prepared in the step (3), 65 kg of hexane was added, and the temperature of the reactor was maintained at 60° C. for 30 minutes with stirring. After the stirring, the mixture was allowed to stand for 30 minutes to settle the precipitates down and the supernatant fluid was removed. The process of adding hexane to the catalyst slurry, washing and removing the supernatant fluid was repeated 6 times in the same manner as above, to prepare a catalyst finally.

The particle size distributions of resulted carrier and catalyst were measured by a laser particle analyzer (Mastersizer X manufactured by Malvern instruments), and the composition of the catalyst was determined by an inductively coupled plasma analyzer (ICP).

The catalyst prepared as so far described, comprised 2.5 wt % of titanium(Ti) and 18.8 wt % of magnesium (Mg) and had an average particle size of 17 μm and the catalyst production yield was 120%. The catalyst production yield was represented as a percentage of the weight of the resulted catalyst to the weight of $MgCl_2$ initially added. The average particle size measured was represented in Table 1 below.

[Polymerizaton]
For evaluating the performance of the catalyst prepared above, propylene polymerization was carried out. In a glove box maintained in nitrogen atmosphere, 7 mg of the catalyst prepared above was weighed and placed into a glass bulb, and the glass bulb was sealed. The bulb was mounted in a 2 L high-pressure reactor so that the glass bulb can be broken when the agitation started, so as to initiate the reaction. The high-pressure reactor was purged with nitrogen for 1 hour to have dry nitrogen atmosphere. To the reactor, triethylaluminum (with the ratio of Al/Ti being 450) and dicyclopentyldimethoxy silane (with the ratio of Si/Al being 0.1) as an external electron donor were added, and the reactor was closed hermetically. 1,000 ml of hydrogen was added to the reactor and 1,200 ml of liquid propylene was added thereto by using a syringe pump, and then agitation was started to break the glass bulb and initiate polymerization reaction, simultaneously elevating the temperature of the reactor to 70° C. over 20 minutes. The polymerization reaction was carried out for 1 hour. After the 1 hour-polymerization reaction, unreacted propylene was vented out, and the temperature of the reactor was lowered to the roan temperature, thereby finally obtaining resulted polymer.

The produced polymer was dried in a vacuum oven at 50° C. and weighed to measure the polymerization activity of the catalyst. Measured were the content of decane soluble and bulk density of the resulted polymer, and also the isotactic index (II, [mmmm] pentad ratio) of the polymer was measured by using NMR ($C_{13}$-NMR). The results of the measurements are represented Table 1 below.

EXAMPLE 2

The preparation of a catalyst was carried out in the same manner as in Example 1, except that the washing process of the step (4) in Example 1 was carried out by: adding 87 kg of toluene to the catalyst slurry obtained from the step (3), stirring the mixture while maintaining the temperature of the reactor at 60° C. for 30 minutes, allowing to stand for 30 minutes to settle the precipitates down and removing the supernatant fluid; then repeating above procedure further 2 times with the resulted catalyst slurry by adding the same amount of toluene, washing and removing process; and subsequently adding 65 kg of hexane thereto, washing at 60° C. and removing in the same manner as above; then repeating above procedure further 2 times with the resulted catalyst slurry by adding the same amount of hexane, washing and removing process. The average particle size of the resulted catalyst was measured in the same manner as in Example 1 and represented in Table 1 below.

Further, propylene polymerization was carried out in the same manner as in Example 1, in order for evaluating the performance of the resulted catalyst. With the resulted polymers, properties such as determined in Example 1 were measured in the same manner as in Example 1, and the results are represented in Table 1.

EXAMPLE 3

The preparation of a catalyst was carried out in the same manner as in Example 1, except that the washing process of the step (4) in Example 1 was carried out by: adding 87 kg of toluene to the catalyst slurry obtained from the step (3), stirring the mixture while maintaining the temperature of the reactor at 80° C. for 30 minutes, allowing to stand for 30 minutes to settle the precipitates down and removing the supernatant fluid; then subsequently adding 65 kg of hexane thereto, washing at 60° C. and removing in the same manner as above; and then repeating washing procedure 5 times with the resulted catalyst slurry by adding the same amount of hexane, washing at 25° C. and removing in the same manner as above. The average particle size of the resulted catalyst was measured in the same manner as in Example 1 and represented in Table 1 below.

Further, propylene polymerization was carried out in the same manner as in Example 1, in order for evaluating the performance of the resulted catalyst. With the resulted polymers, properties such as determined in Example 1 were measured in the same manner as in Example 1, and the results are represented in Table 1.

EXAMPLE 4

The preparation of a catalyst was carried out in the same manner as in Example 1, except that the washing process of the step (4) in Example 1 was carried out by: adding 87 kg of toluene to the catalyst slurry obtained from the step (3), stirring the mixture while maintaining the temperature of the reactor at 80° C. for 30 minutes, allowing to stand for 30 minutes to settle the precipitates down and removing the supernatant fluid; then repeating above procedure further 2 times with the resulted catalyst slurry by adding the same amount of toluene, washing and removing process; and subsequently adding 65 kg of hexane thereto, washing at 25° C. and removing in the same manner as above; then repeating above procedure further 2 times with the resulted catalyst slurry by adding the same amount of hexane, washing and removing process. The average particle size of the resulted catalyst was measured in the same manner as in Example 1 and represented in Table 1 below.

Further, propylene polymerization was carried out in the same manner as in Example 1, in order for evaluating the performance of the resulted catalyst. With the resulted polymers, properties such as determined in Example 1 were measured in the same manner as in Example 1, and the results are represented in Table 1.

COMPARATIVE EXAMPLE 1

The preparation of a catalyst was carried out in the same manner as in Example 1, except that the washing process of the step (4) in Example 1 was carried out by: adding 65 kg of hexane to the catalyst slurry obtained from the step (3), stirring the mixture while maintaining the temperature of the reactor at 25° C. for 30 minutes, allowing to stand for 30 minutes to settle the precipitates down and removing the supernatant fluid; then repeating above procedure further 5 times with the resulted catalyst slurry by adding the same amount of hexane, washing and removing process. The average particle size of the resulted catalyst was measured in the same manner as in Example 1 and represented in Table 1 below.

Further, propylene polymerization was carried out in the same manner as in Example 1, in order for evaluating the performance of the resulted catalyst. With the resulted polymers, properties such as determined in Example 1 were measured in the same manner as in Example 1, and the results are represented in Table 1.

COMPARATIVE EXAMPLE 2

The preparation of a catalyst was carried out in the same manner as in Example 1, except that the washing process of the step (4) in Example 1 was carried out by: adding 87 kg of toluene to the catalyst slurry obtained from the step (3), stirring the mixture while maintaining the temperature of the reactor at 25° C. for 30 minutes, allowing to stand for 30 minutes to settle the precipitates down and removing the supernatant fluid; then subsequently adding 65 kg of hexane thereto, washing at 25° C. and removing in the same manner as above; and then repeating above procedure further 5 times with the resulted catalyst slurry by adding the same amount of hexane, washing at 25° C. and removing in the same manner as above. The average particle size of the resulted catalyst was measured in the same manner as in Example 1 and represented in Table 1 below.

Further, propylene polymerization was carried out in the same manner as in Example 1, in order for evaluating the performance of the resulted catalyst. With the resulted polymers, properties such as determined in Example 1 were measured in the same manner as in Example 1, and the results are represented in Table 1.

TABLE 1

|  | Examples | | | | Comparative Examples | |
| --- | --- | --- | --- | --- | --- | --- |
|  | 1 | 2 | 3 | 4 | 1 | 2 |
| Average catalyst particle size (μm) | 17 | 19 | 16 | 21 | 20 | 19 |
| Polymerization activity (kg PP/g catalyst) | 43 | 38 | 43 | 38 | 36 | 33 |
| Decane soluble (%) | 0.5 | 0.3 | 0.8 | 0.2 | 1.8 | 2.6 |
| Isotactic index (%) | 96.6 | 96.9 | 96.7 | 97.0 | 95.3 | 94.7 |
| Bulk density (g/ml) | 0.43 | 0.43 | 0.43 | 0.44 | 0.44 | 0.42 |

INDUSTRIAL APPLICABILITY

According to the preparation method of a catalyst of the present invention, it is possible to obtain a catalyst for olefin polymerization having well-controlled spherical particle shape, and, when using the catalyst in olefin polymerization, an olefin polymer with high stereoregularity, low content of decane soluble and spherical particle shape.

The invention claimed is:

1. A preparation method for a solid titanium catalyst for olefin polymerization, which comprises the steps of:
   (1) preparing a magnesium compound solution by dissolving a magnesium halide compound into a mixed solvent of a cyclic ether and one or more of alcohol;
   (2) preparing a carrier by adding firstly a titanium halide compound having a general formula of $Ti(OR)_aX_{(4-a)}$, in which R is an (4-a) alkyl group having 1-10 carbon atoms, X is a halogen atom and a is an integer of 0-3, to the magnesium compound solution at −10-30° C., wherein the molar ratio of the firstly-added titanium halide compound to the mixed solvent of cyclic ether and one or more of alcohol is 1:3.0-1:10, elevating the temperature of the resulted solution or aging it, and then thereto adding secondly the titanium halide compound additionally;
   (3) preparing a titanium catalyst by reacting the carrier with a titanium compound and an electron donor; and
   (4) washing the titanium catalyst with hydrocarbon solvent at 40-200° C.

2. The preparation method for a solid titanium catalyst for olefin polymerization according to claim 1, wherein the cyclic ether used in the step (1) is tetrahydrofuran or 2-methyltetrahydrofuran, and the one or more of alcohol used in the step (1) is primary or polyhydric alcohol having 2-12 carbon atoms.

3. The preparation method for a solid titanium catalyst for olefin polymerization according to claim 1, wherein the molar ratio of the cyclic ether to the one or more of alcohol used in the step (1) is 1:0.1-1:10.

4. The preparation method for a solid titanium catalyst for olefin polymerization according to claim 1, wherein the washing of the titanium catalyst is repeated 2-10 times with hydrocarbon solvent at 40-200° C. in the step (4).

5. The preparation method for a solid titanium catalyst for olefin polymerization according to claim 2, wherein the molar ratio of the cyclic ether to the one or more of alcohol used in the step (1) is 1:0.1-1:10.

* * * * *